United States Patent
Loren et al.

(10) Patent No.: US 9,647,861 B1
(45) Date of Patent: May 9, 2017

(54) MULTIPLE ANTENNA TRANSMISSION OF PULSED DATA COMMUNICATION MESSAGES WITH PHASE OR TIME DITHERING FOR REDUCTION OF STATIC INTERFERENCE NULLS

(71) Applicant: Rockwell Collins, Inc., Cedar Rapids, IA (US)

(72) Inventors: Eric J. Loren, North Liberty, IA (US); Ray L. Cross, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/168,482

(22) Filed: Jan. 30, 2014

(51) Int. Cl.
*H04B 7/06* (2006.01)
*H04L 27/10* (2006.01)

(52) U.S. Cl.
CPC .................................. *H04L 27/10* (2013.01)

(58) Field of Classification Search
CPC ............................. H04B 7/0671; H04B 7/0676
USPC .................................................. 375/267, 299
See application file for complete search history.

(56) References Cited

U.S. PATENT DOCUMENTS

| | | | | |
|---|---|---|---|---|
| 2,776,366 A * | 1/1957 | Estes | ........................ | H04B 7/06 375/267 |
| 7,145,958 B2 * | 12/2006 | Yoneyama | ........... | H04B 7/0678 375/267 |
| 7,346,316 B1 * | 3/2008 | Kubo | ........................... | 455/101 |
| 8,576,946 B2 * | 11/2013 | Chugg | .................. | H04B 7/026 375/299 |
| 8,913,677 B2 * | 12/2014 | Rao | ..................... | H04B 7/0671 375/267 |
| 2005/0254592 A1 * | 11/2005 | Naguib et al. | ................ | 375/267 |
| 2007/0069953 A1 * | 3/2007 | Ling | ........................ | G01S 5/021 342/463 |
| 2007/0206686 A1 * | 9/2007 | Vook | .................... | H04B 7/0671 375/260 |
| 2008/0150801 A1 * | 6/2008 | Harel et al. | .................... | 342/368 |
| 2010/0290550 A1 * | 11/2010 | Rietman et al. | ............... | 375/260 |
| 2014/0273874 A1 * | 9/2014 | Clevorn et al. | ............. | 455/67.13 |

OTHER PUBLICATIONS

Hiroike, et al, Combined Effects of Phase Sweeping Transmitter Diversity and Channel Coding, IEEE Transactions on Vehicular Technology, vol. 41, No. 2, May 1992.

* cited by examiner

*Primary Examiner* — Kevin Kim
(74) *Attorney, Agent, or Firm* — Angel N. Gerdzhikov; Donna P. Suchy; Daniel M. Barbieri

(57) ABSTRACT

A system and method for reducing the duration of destructive interference received at a location from two transmitting antennas where either a time varying phase shift or time varying delay or both are introduced into the signal paths of one or both of the two antennas.

12 Claims, 4 Drawing Sheets

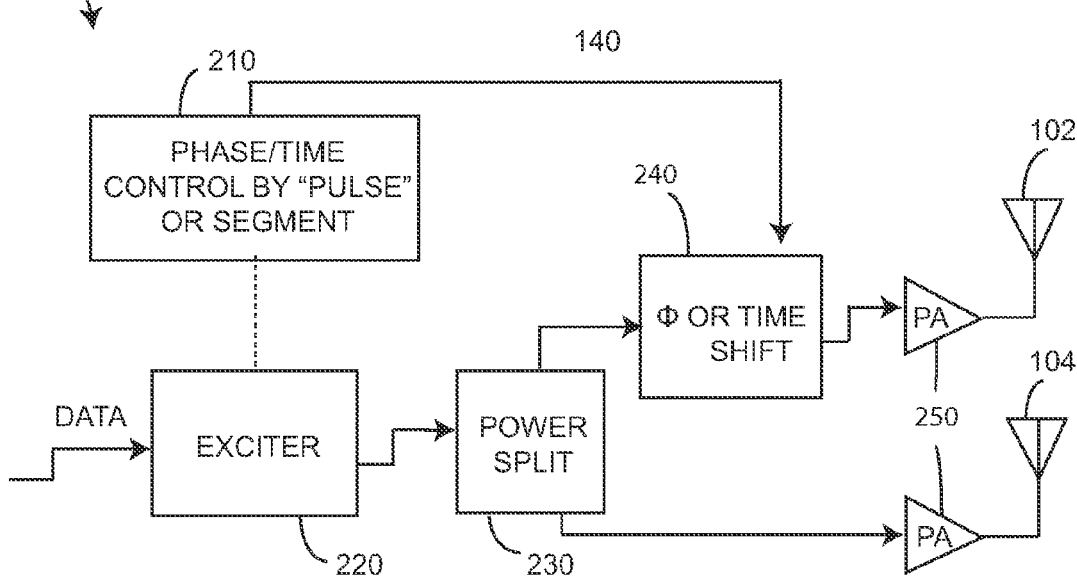
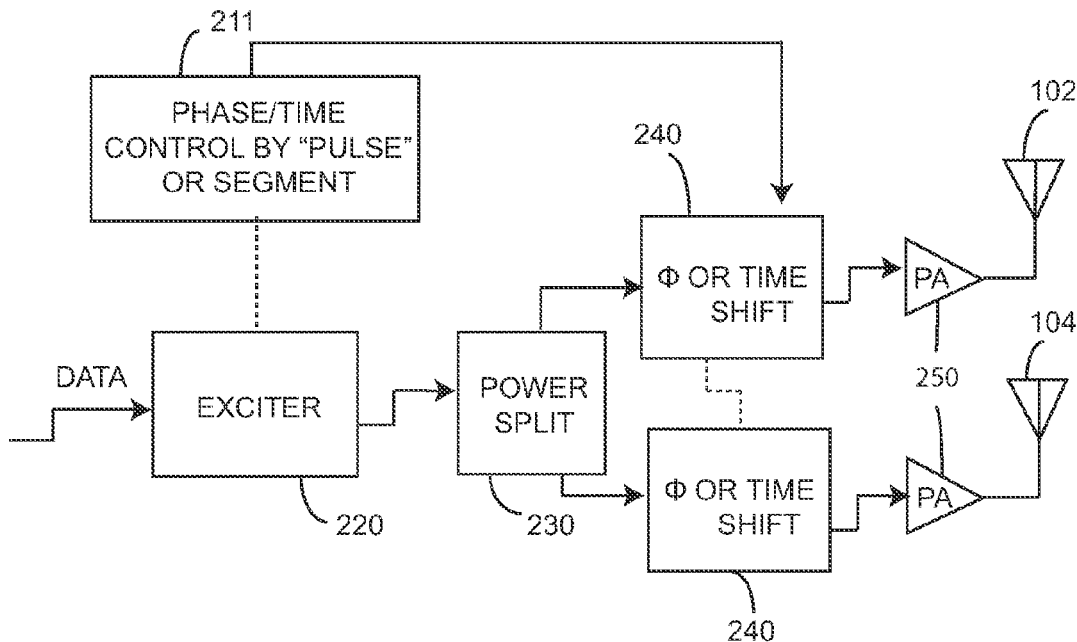

MULTIPLE ANTENNA TRANSMISSION OF PULSED DATA COMMUNICATION MESSAGES WITH PHASE OR TIME DITHERING FOR REDUCTION OF STATIC INTERFERENCE NULLS

BACKGROUND OF THE INVENTION

The present invention relates to multi-transmit antenna wireless communication and may be more beneficial, in some embodiments, with pulsed data communications with coded signals superimposed on discrete separated-in-time radio frequency pulses such as some military frequency hopping data links or aircraft transponder systems.

When two radio antennas are used to transmit a signal (i.e. there are two sources of the radio waves), these waves interact with each other. The principle of superposition says that the resulting wave is the sum of the two individual waves. This phenomenon is generally described as interference.

When the crests of the two waves overlap, the superposition wave reaches a maximum height. This height is the sum of their amplitudes (or twice their amplitude, in the case where the initial waves have equal amplitude). The same happens when the troughs overlap, creating a resultant trough that is the sum of the negative amplitudes. This sort of interference is called constructive interference, because it increases the overall amplitude.

Alternately, when the crest of a wave overlaps with the trough of another wave, the waves cancel each other out to some degree. If the waves are symmetrical (i.e. the same wave function, but shifted by a phase or half-wavelength), they will cancel each other completely. This sort of interference is called destructive interference.

In the past, some prior art radio communication systems and methods required mitigating multiple-source (multi-antenna) problems arising from overlapping zones in some types of single-frequency-channel terrestrial mobile communications systems. In those systems, coverage is extended to a larger geographical area by providing multiple transmitting sites at geographically diverse locations that provide overlapping zones of coverage. Since these kinds of systems use the same nominal transmit frequency, the possibility of wave interference problems exist in the regions of zone overlap, which could (in the case of destructive interference) prevent the receiving station from receiving the signals from any site. It is well known in the art that introducing slightly different characteristics to each transmitted signal will cause the receiving equipment typically used in these systems to process the signals from the "best" source. These kinds of systems typically rely on the "FM Capture" or another non-linear demodulation effect wherein a receiver that accomplishes frequency demodulation tends to output the demodulated signal of the strongest signal of a multiple signal input at a disproportionally higher signal-to-noise ratio (SNR) than what the input SNR would suggest. The nature of the differing characteristics of the other sources is chosen to result in manageable level of interference to the receiver. Some examples include: In U.S. Pat. No. 4,032,846, the differing characteristic is that a slight but differing frequency offset (from the same nominal transmit frequency) is used at each transmitting site. In U.S. Pat. No. 4,490,830, the differing characteristic is that data signals input into the modulators are adjusted to have differing phase shifts at each transmitting site. In U.S. Pat. No. 4,223,405, the differing characteristic is that data signals are additively combined with specially chosen deterministic signal patterns prior to final modulation step with the deterministic signal patterns chosen to be different at each transmitting site. In U.S. Pat. No. 4,570,265, the differing characteristic is that data signals are additively combined with random signal patterns prior to final modulation step with the random signals different at each transmitting site.

While these prior art techniques did provide utility in the past, they do not work as well where the receiving equipment cannot be expected to rely on the "FM Capture" or another non-linear demodulation effect. Moreover, generally in a class of higher data rate signals using complex modulations, a non-linear demodulator is typically not possible and the receiver must process the full signal as received.

Consequently, there exists a need for improved systems and methods for reducing a static nature of interference nulls in multi-transmitting antenna pulsed data communication systems.

SUMMARY OF THE INVENTION

It is an object of the present invention to provide an improved ability to receive signals from multiple transmitting antennas where the receivers are mobile with respect to the location of the multiple transmitting antennas.

It is a feature of the present invention to include a relative phase or time shift in signals being transmitted by multiple antennas.

It is an advantage of the present invention to reduce, at any given instant, a likelihood or duration of time that a distant receiver will remain in a null region of an interference pattern created by the multiple transmitting antennas.

The present invention is a method and apparatus for transmitting with multiple antennas, which is designed to satisfy the aforementioned needs, provide the previously stated objects, include the above-listed features and achieve the already articulated advantages.

Accordingly, the present invention is a method and apparatus which introduces a phase or time shift into at least one antenna path of multiple transmitting antennas.

The present invention is a method of reducing a duration of destructive interference between signals transmitted from a plurality of antennas comprising the steps of:

Providing a plurality of transmitting antennas;

Providing information to be communicated to a remote receiver using said plurality of transmitting antennas;

Introducing at least one of a time variable phase shift and a time variable delay between a plurality of signals carrying said information;

Independently transmitting each of said plurality of signals from a different one of said plurality of transmitting antennas, so that a duration of destructive interference between said plurality of signals at any location is reduced.

BRIEF DESCRIPTION OF THE DRAWINGS

The invention may be more fully understood by reading the foregoing description of the preferred embodiments of the invention in conjunction with the appended drawings wherein:

FIG. 3 is a simplified diagram of a dual PA design of the present invention, where dotted lines refer to sync data.

FIG. 4 is a simplified diagram of a dual PA design of the FIG. 3 except with an additional shifter, where dotted lines refer to sync data.

DETAILED DESCRIPTION

Figure 1:
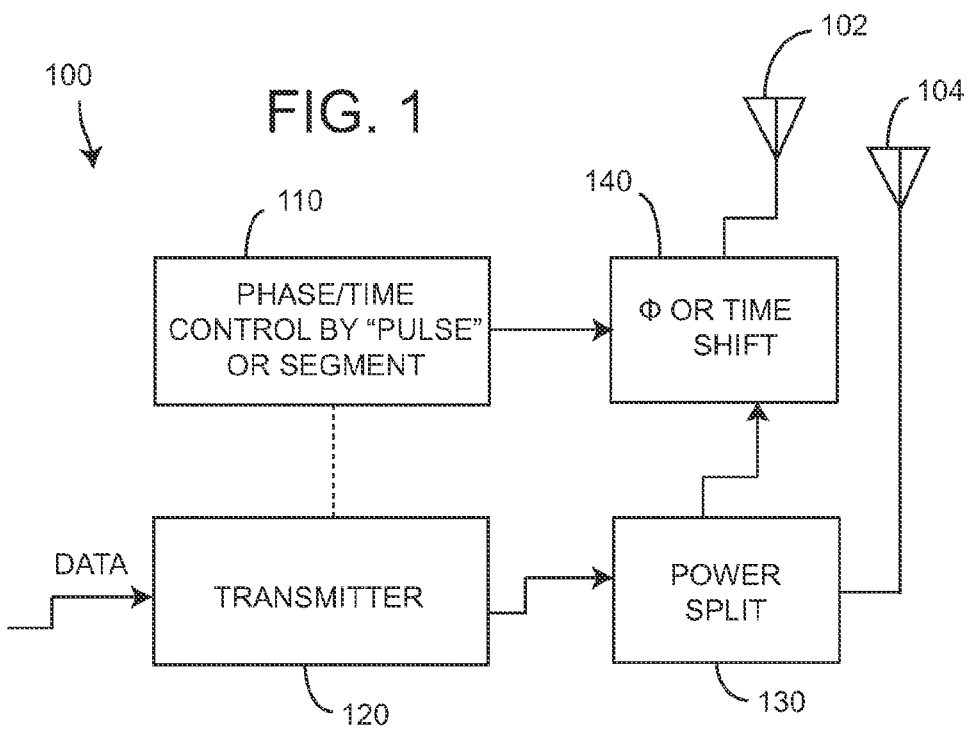
FIG. 1 is a simplified diagram of a single transmitter/PA design of the present invention, where dotted lines refer to sync data.

Now referring to the drawings, wherein like numerals refer to like matter throughout, and more particularly to FIG. 1, there is shown a simplified representation of a single transmitter and dual antenna system of the present invention generally designated 100 which includes a Phase/Time Control module 110 for controlling phase and/or time shifting by the transmitted pulse or a segment. Control module 110 is in sync (dotted line) with the transmitter 120. The selected phase or time shift could be predetermined variable, random or pseudo-random/quasi-random so that the relative phasing or timing of the two signals is changed. This phase shift or timing shift is preferably done at modulation boundaries of the transmitted signal such as pulses or framing/sync signal. The particular nature of the selected phase or time shift and its appropriate application at modulation boundaries for specific transmit systems will be apparent to those skilled in the art. The application of selected phase or time shifts to the signals of the antennas 102 and 104 is timed to match segments of the transmitted signal that will be processed at the receiver as a composite whole. Since the time delay effect from the multiple antennas on the superimposed modulation is negligible, the receiver processes the segments as normal without any additional knowledge of the application of the additional phase or time shifting applied a result of the present invention.

Transmitter 120 could be any general transmitter comprising sufficient stages necessary to impress or modulate data onto a carrier and then amplify such signal to the required transmit power, but in a preferred embodiment it would be a pulse transmission system wherein the data to be transmitted is divided into segments and either repeated or coded so that data can be impressed on individual transmit pulses.

Transmitter 120 is coupled to a power splitter 130 which provides an amplified signal to antennas 102 and 104. Disposed between power splitter 130 and antenna 102 is a continuously variable or switched phase or continuously variable or switched time-delay (and associated logic) 140 designed to work on signals at the full transmit power level. This phase or time shifter could be incorporated or integrated within other general purpose antenna interface unit circuitry which receives control input from control module 110.

Figure 2:
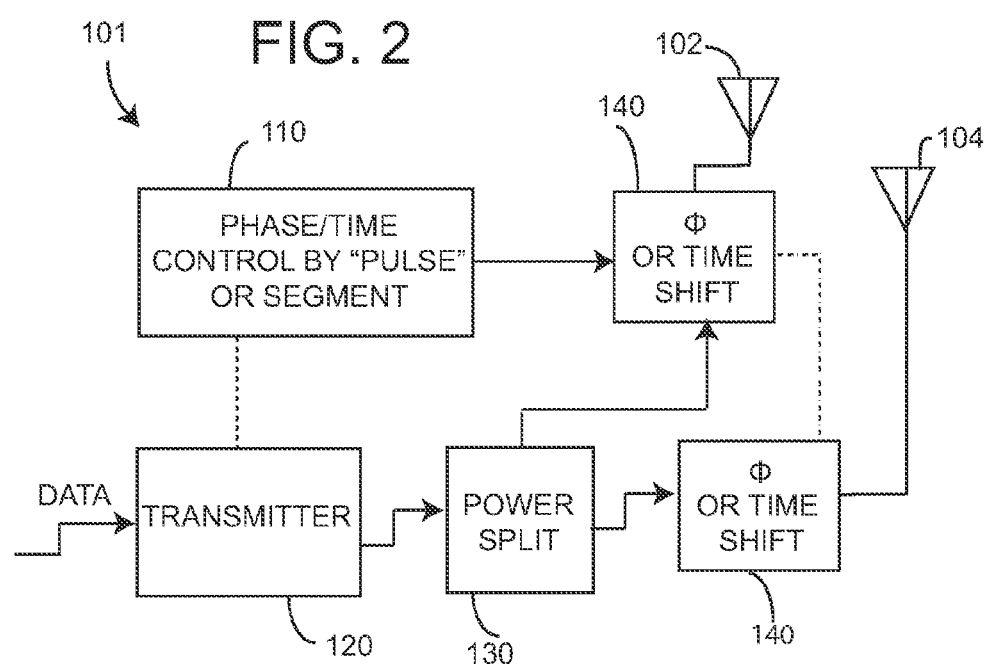
FIG. 2 is a simplified diagram of a single transmitter/PA design of the present invention shown in FIG. 1 but with an additional shifter, where dotted lines refer to sync data.

Now referring to FIG. 2, there is shown a system of FIG. 1 except that an additional shifter is included with sync data and control connecting the shifters 140.

Now referring to FIG. 3, there is shown an alternate embodiment of the present invention wherein the phase or time shifter 240 operates on signals which have not been fully amplified for transmission. The transmitter 120 of FIG. 1 is replaced in FIG. 3 by the Exciter 220, which provides modulated signals at the carrier frequency at a level not yet amplified to the final power level, and individual power amplifiers 250, one for each transmission path. Phase or time shifter 240 is similar to phase or time shifter 140 except that it could be a continuously variable or switched phase shifter or a switched time-delay (and associated logic) designed to work on signals which have not been fully amplified. Power splitter 230 divides the signal to be transmitted into two transmission paths at a point in each path where the signal is not yet fully amplified for transmission.

Now referring to FIG. 4, there is shown a simplified diagram of a dual PA design of the FIG. 3 except with an additional shifter.

Figure 5:
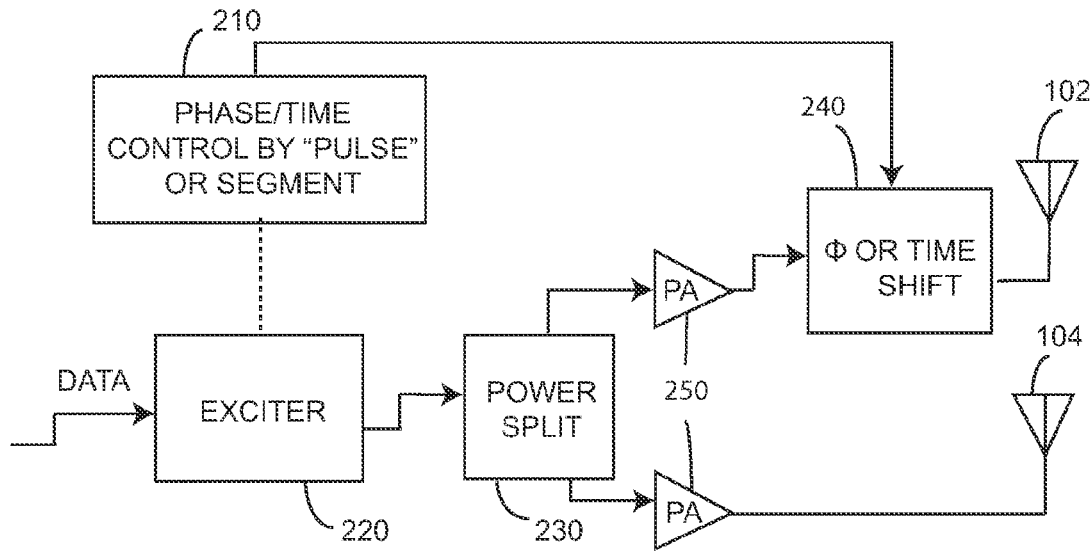
FIG. 5 is a simplified diagram of a dual PA design of the FIG. 3 except with the PAs moved away from the antennas, where dotted lines refer to sync data.

Now referring to FIG. 5, there is shown a simplified diagram of a dual PA design of the FIG. 3 except with the PAs moved away from the antennas.

Figure 6:
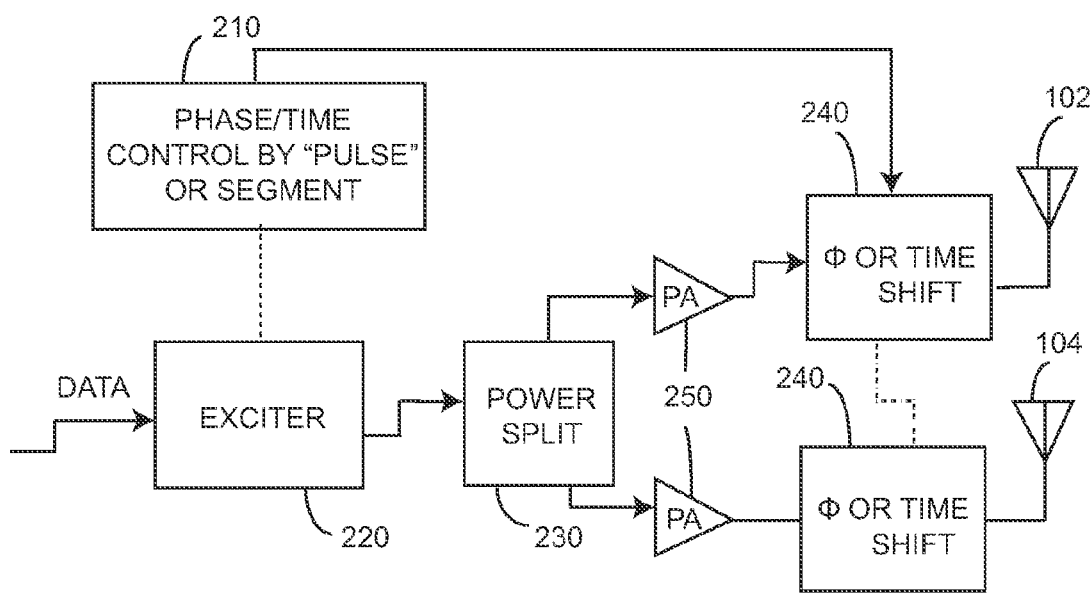
FIG. 6 is a simplified diagram of a dual PA design of the FIG. 5 except with an additional shift, where dotted lines refer to sync data.

Now referring to FIG. 6, there is shown a simplified diagram of a dual PA design of the FIG. 5 except with an additional shifter.

Figure 7:
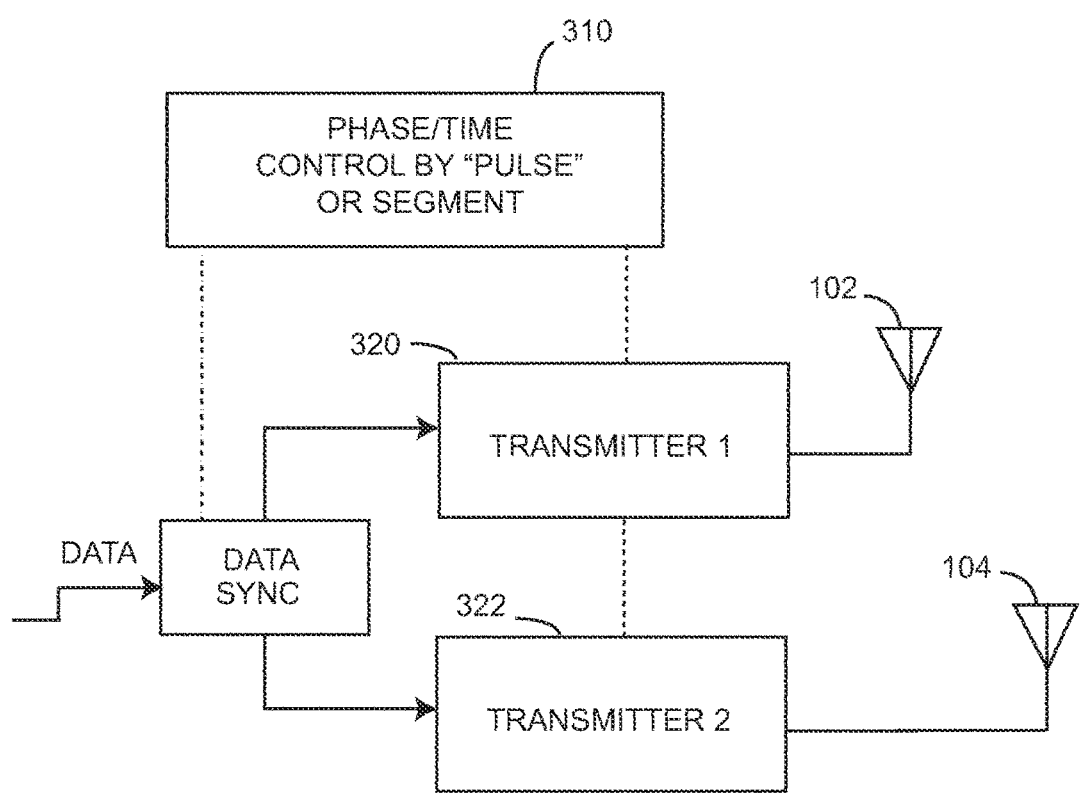
FIG. 7 is a simplified diagram of a dual transmitter design of the present invention where the transmitters are independent (not sharing common circuits through the modulation and power amplification stages) transmitters but have controlled relations of timing and phase imposed in a synchronized manner.

Now referring to FIG. 7, there is shown an alternate embodiment of the present invention where transmitters 320 and 322 are independent but synchronized transmitters each comprising sufficient circuitry to produce a modulated signal at the desired carrier frequency and power, with the relative time/phase characteristics to be impressed as part of the overall modulation or transmission process with the phase or time characteristics synchronized by the phase/time shift control 310.

Now referring to FIGS. 1-7, although the present invention could also be applied to the multiple transmitting site overlapping zone case, as was addressed by prior art techniques, it would be more beneficially applied in cases where multiple antennas 102 and 104 are used at on a single vehicle or at a single transmitting site complex to provide a more general range of angular coverage than could be provided by a single antenna alone. Under these conditions, the slight time or phase delays from the multiple antennas are most relevant to the center carrier frequency resulting constructive or destructive wave interference in the zones of overlap with negligible distortion to the superimposed modulation signal. The zones of constructive interference will result in effectively increased signal level and presumably improved performance. However, the zones of destructive interference will result in effectively reduced signal level and reduced performance. The zones of constructive and destructive interference can be conceptualized as the result of an undesired static phase-array antenna with a static pattern with undesirable nulls. The present invention can be conceptualized as a means of changing the static pattern into a dynamic pattern so that the nulls do not stay at fixed angles. Without the present invention, a receiver positioned in a zone of destructive interference would be disadvantaged in receive capabilities due to the weak signal in that zone. If there were only one receiving station with a known position relative to the transmitting antenna, it would be possible to arrange the combined pattern of the transmitting antennas such that they would not produce a zone of destructive interference at the receive location using principles well known to those skilled in the art. However with multiple receiving stations or with stations that have unknown position or have movement unknown to the transmitting site, at least some receivers will be located within zones of destructive interference at some times. With the present invention, each signal segment will be subject to a different set of relative phase or time shifts applied at the transmitting antennas so that each segment processed by the receiver is seen by the receiver at a different signal amplitude eliminating nulls if that receiver would have otherwise been located within a zone of destructive interference.

Since the phase or time shift is applied by segment, the present invention is best applied to signals which have the property such that they can be processed by the receiver in discrete segments. Further, since each segment can be subject to extremes in signal strength and therefore differing degrees of reliability in the demodulation, the present invention is best applied to signals which repeat or otherwise redundantly code the information to be conveyed across multiple signal segments. Repeating or redundant coding (such as Forward Error Correction Coding) are well known techniques that can be applied by any person skilled in the art. However, many existing systems already have this property, thereby permitting the application of the present invention to prior systems. An example of systems that transmit suitable signals include those that transmit coded signals superimposed on discrete separated-in-time radio frequency pulses such as some military frequency-hopping data links. Aircraft transponder systems provide another example. The use of distinct pulses is not necessary. The present invention could also be applied to continuously transmitting systems if the data or modulation were framed in a way that permits separate demodulation of distinct segments. Modulations, data framings, and data coding suitable for the application of the present invention will be apparent to those suitably skilled in the art.

It is thought that the method and apparatus of the present invention will be understood from the foregoing description and that it will be apparent that various changes may be made in the form, construction, steps and arrangements of the parts and steps thereof, without departing from the spirit and scope of the invention or sacrificing all of their material advantages. The form herein described is merely a preferred or exemplary embodiment thereof.

We claim:

1. A method for adjusting destructive interference between signals transmitted from a plurality of independently functioning antennas on a single aircraft, the method comprising the steps of:
   providing information to be communicated to a remote receiver using said plurality of independently functioning antennas;
   introducing at least one of a time variable phase shift and a time variable delay between a plurality of signals carrying said information; and
   independently transmitting each of said plurality of signals from a different one of said plurality of independently functioning antennas utilizing separate transmitters to dynamically adjust a null region formed due to destructive interference between the plurality of signals,
   wherein
      said step of providing information to be communicated further comprises redundantly coding the information across a plurality of message segments;
      said step of independently transmitting further comprises transmitting said message segments on a plurality of discrete separated-in-time radio frequency pulses; and
      said step of introducing further comprises introducing time variability across said plurality of discrete separated-in-time radio frequency pulses and is constant within a single one of said plurality of discrete separated-in-time radio frequency pulses.

2. The method of claim 1 wherein said step of introducing comprises introducing a time variable phase shift which is time variable across said plurality of discrete separated-in-time radio frequency pulses and is constant within a single one of said plurality of discrete separated-in-time radio frequency pulses.

3. The method of claim 2 wherein said step redundantly coding comprises forward error correction coding.

4. The method of claim 1 wherein:
   said step of providing information to be communicated further comprises repeating the information across a plurality of message segments; and
   said step of independently transmitting further comprising transmitting said message segments on a plurality of frames of a continuously transmitted signal.

5. The method of claim 1 wherein said step of providing a plurality of transmitting antennas comprises providing a plurality of transmitting antennas at fixed locations with respect to each other.

6. A system for reducing a duration of destructive interference at a given location comprising:
   a plurality of independently functioning transmitting antennas, the plurality of independently functioning transmitting antennas in combination provide a more general range of angular coverage than could be provided by a single antenna alone;
   a source of information to be communicated to a remote location;
   a plurality of transmit paths each carrying said information to be communicated and each terminating with a different one of said plurality of independently functioning transmitting antennas;
   a time variable shifter configured to affect operation of at least one of said plurality of transmit paths where said time variable shifter is configured for varying, in a pseudo random fashion, one of a phase and a time delay, so that a remote receiver of signals transmitted from said plurality of independently functioning transmitting antennas has a reduced duration of times of reception of destructively interfering signals,
   wherein said plurality of transmit paths is configured to:
      redundantly code the information across a plurality of message segments;
      transmit said message segments on a plurality of discrete separated-in-time radio frequency pulses, and
      introduce time variability across said plurality of discrete separated-in-time radio frequency pulses, wherein the time variability is constant within a single one of said plurality of discrete separated-in-time radio frequency pulses.

7. The system of claim 6, wherein said time variable shifter is in sync with and provides control to a first transmitter located in said at least one of said plurality of transmit paths, wherein the system further comprises a second independent transmitter located in another of said plurality of transmit paths, and wherein said second transmitter and said first transmitter are synchronized.

8. The system of claim 6 further comprising a power amplifier between said time variable shifter and one of said plurality of transmitting antennas.

9. The system of claim 6 further comprising a second time variable shifter configured to affect operation of at least one of said plurality of transmit paths where said time variable shifter is configured for varying one of a phase and a time delay.

10. The system of claim 6 wherein said plurality of transmitting antennas comprises a plurality of transmitting antennas at fixed locations with respect to each other.

11. A system for reducing a duration of destructive interference at a given location comprising:
- a plurality of independently functioning transmitting data communication system antennas located at a fixed location with respect to each other;
- a source of information to be communicated to a remote location;
- a plurality of transmit paths carrying said information to be communicated and each terminating with a different one of said plurality of independently functioning transmitting data communication system antennas;
- a first time variable shifter configured to affect operation of a first one of said plurality of transmit paths where said first time variable shifter is configured for varying, in one of a random, pseudo-random, and a quasi-random manner, one of a phase and a time delay, so that a remote receiver of signals transmitted from said plurality of independently functioning transmitting data communication system antennas has a reduced duration of times of reception of destructively interfering signals;
- a second time variable shifter configured to affect operation of second one of said plurality of transmit paths where said second time variable shifter is configured for varying one of a phase and a time delay;
- a first power amplifier disposed in said first one of said plurality of transmit paths between said first time variable shifter and one of said plurality of independently functioning transmitting data communication system antennas; and
- a second power amplifier disposed in said second one of said plurality of transmit paths between said second time variable shifter and one of said plurality of independently functioning transmitting data communication system antennas,
- wherein said plurality of transmit paths is configured to:
  - redundantly code the information across a plurality of message segments;
  - transmit said message segments on a plurality of discrete separated-in-time radio frequency pulses, and
  - introduce time variability across said plurality of discrete separated-in-time radio frequency pulses, wherein the time variability is constant within a single one of said plurality of discrete separated-in-time radio frequency pulses.

12. The method of claim 1 wherein said step of introducing comprises introducing a pseudo-random phase delay.

* * * * *